Dec. 3, 1935. J. KANTOR Re. 19,777
SIRUP VALVE FOR BOTTLE FILLERS
Original Filed July 29, 1929
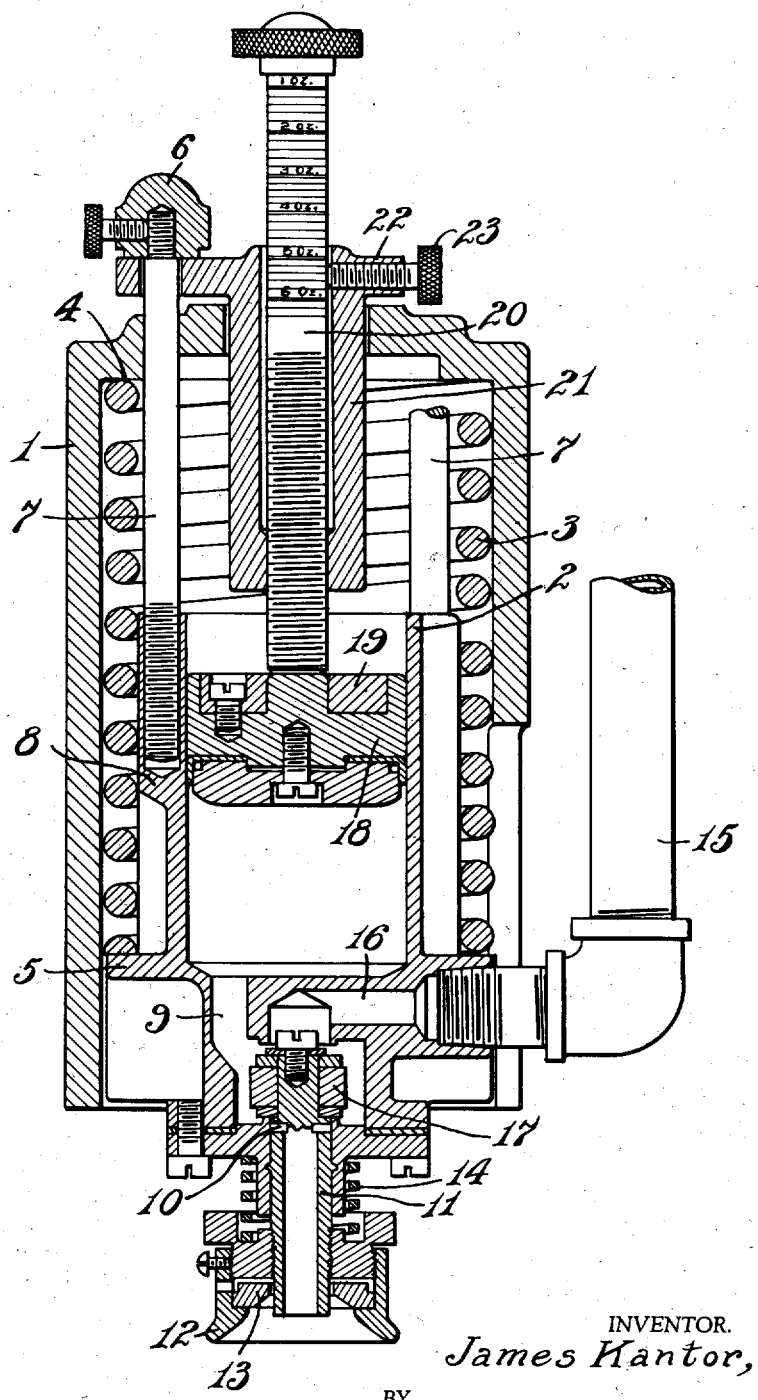
INVENTOR.
James Kantor,
BY
Hood & Hahn.
ATTORNEYS Reissued Dec. 3, 1935 Re. 19,777

UNITED STATES PATENT OFFICE 19,777

SIRUP VALVE FOR BOTTLE FILLERS

James Kantor, Chicago, Ill., assignor to The Liquid Carbonic Corporation, Chicago, Ill., a corporation of Delaware Original No. 1,809,813, dated June 9, 1931, Serial No. 381,927, July 29, 1929. Application for reissue February 20, 1933, Serial No. 657,652

17 Claims. (Cl. 226—103)

My invention relates to improvements in apparatus for delivering sirup for bottle filling machines such, for instance, as bottle machines for bottling carbonated beverages. Heretofore such structures have comprised a sirup receptacle which is reciprocable to be moved down upon and up away from the bottle. This receptacle has been supported by a reciprocating cylinder and in order to insure the discharge of the sirup from the receptacle, there has been provided a plunger. This plunger, when the receptacle comes to rest on the top of the bottle, continues its downward movement in the receptacle insuring the discharge of the sirup from the receptacle. Heretofore this plunger has been raised in the receptacle by the incoming sirup which is discharged into the receptacle after the charge therein has been delivered to the bottle. Some sirups are heavier or thicker than others and as a result require greater weight in the plunger to force the same out of the receptacle. However, heretofore the weight of this plunger has been limited due to the fact that the entire weight tending to force the plunger downwardly under inertia had to be raised by the incoming sirup and in order to get sufficient force, the sirup from the storage tank had to have a considerable "head". It has been necessary, therefore, to place the storage receptacle at a considerable height above the machine and it has been found in some instances that this is impracticable due to the limit of the ceiling height of the bottling factory.

It is one of the objects of my present invention to provide a sirup delivery device wherein the weight of the plunger may be increased during its discharge stroke, while the plunger will be relieved of this increased weight during the inflow of the sirup, thereby providing a relatively heavy plunger for discharge purposes and a relatively light plunger which will require a minimum head in the sirup storage tank for raising the plunger during the inflow into the sirup.

For the purpose of disclosing my invention, I have illustrated one embodiment thereof in which the figure is a longitudinal section of a sirup filling apparatus embodying my invention.

In the embodiment of the invention illustrated, I provide a cylinder support 1 which is adapted to be secured to a reciprocating part of the machine and is adapted to be vertically reciprocated. Within the support is mounted the sirup receptacle 2, which may also be of cylindrical shape. A compression spring 3 is interposed between the parts 1 and 2, the upper end of the spring engaging the top 4 of the cylinder 1 and the lower end engaging an annular flange 5 at the lower end of the receptacle 2. The relative movement in one direction between the cylinder 1 and the receptacle 2, under the influence of the spring 3, is limited by adjustable stop nuts 6 at the top of the guide rods 7. These guide rods project through the top of the cylinder 1 and at their lower ends are screw threaded into bosses on the sides of the receptacle 2 providing for further adjustment of the stop nuts. It is obvious that by adjusting the nuts 6, through their threaded engagement with the rod 7, or by adjusting the rod 7 through its threaded engagement with the cylinder 8, the nuts 6 provide adjustable stops for the cylinder 8 and its position relative to the support 1 may be thereby modified. The bottom of the receptacle 2 is provided with a discharge and inlet port 9, which discharges through an opening 10 into a spout 11 having at its lower end a mouth piece 12 adapted, when the structure is lowered, to engage the top of the bottle. This mouth piece is provided with a washer 13. The spout has a slight movement relative to the bottom of the receptacle 2 and is biased toward the outermost limit of its movement by a coiled spring 14 interposed between the bottom of the receptacle and the mouth piece 12. The flow of sirup from the receptacle 2 and through the port 9 into the mouth piece 11 and the flow of sirup from the supply pipe 15 through the port 16 and into the receptacle is controlled by a valve 17, which when the receptacle is in its raised position, closes the spout 11 and allows the flow of sirup from the port 16 into the receptacle 2. When, however, the receptacle is in its lowermost position and in contact with the bottle, the valve is in its raised position shutting off the flow of sirup from the port 16 and opening access to the spout 11.

Operating within the receptacle 2 is a plunger 18, the weight of which may be increased by an annular removable weight 19, and which is adapted to be engaged by a threaded stem 20. This stem is threaded into the lower end of an elongated cylindrical nut member 21 projecting through a top opening in the cylinder and provided at its upper end with an annular flange 22 by which it is supported from the top of the cylinder. This flange is provided with openings through which the guide rods 7 pass. The stem is screw threaded in this nut which permits of the adjustment of the plunger 18 to vary the height to which the plunger may be moved in the receptacle 2 and after having been adjusted the stem may be locked in its adjusted position by means of a locking screw 23.

In operation, when the bottle has been placed beneath the mouth piece 12, the cylinder 1 moves downwardly carrying with it the receptacle 2. Due to the spring 3, however, after the mouth piece 12 has come in contact with the neck of the bottle, to thereby check the downward movement of the receptacle 2, the cylinder 1 can continue in its downward movement. This continued downward movement leaves the weight of the stem 20 and nut 21 unsupported and this weight, plus the weight of the plunger 18 will move downwardly under the influence of gravity thereby forcing the sirup in the chamber 1 out through the spout 11 and into the bottle, the valve 17 having been raised when the mouth piece comes in contact with the neck of the bottle. As soon as the plunger reaches the lowermost limit of its downward movement, the bottom of the receptacle acting as a stop for the plunger to prevent its contacting with the valve, the cylinder 1 commences its upward stroke, its top engaging the flange 22, first raising the stem 20 and nut 21 and the flange then engaging the stop nut 6, thereby raising the receptacle 2. This permits the valve 7 to drop back on its seat over the mouth piece 11 closing the discharge opening of the receptacle and opening the inlet of the receptacle so that the sirup may flow from the supply pipe 15 into the receptacle. The inflow of the sirup raises the plunger 18, the stem 20 having been raised out of its path, until the plunger 18 comes in contact with the bottom of the stem. This limits the upward movement of the plunger and stops the inflow of sirup.

It will therefore be noted that during the discharge movement of the plunger the weight thereof is materially increased by the weight of the stem 20 and the nut 21, but that during the filling of the receptacle the weight of the stem and nut has been removed from the plunger 18 so that it will offer comparatively slight resistance to the inflow of the sirup.

I claim as my invention:

1. In a sirup dispenser for bottle filling machines, the combination with a reciprocating cylinder, of a sirup receptacle mounted therein, movable with and relatively to said cylinder, a filler spout carried by said receptacle and having a limited movement relative thereto, a valve operated by said spout for controlling the delivery of sirup to and from said receptacle, a plunger operating in said receptacle, means for positioning said plunger in said receptacle, and a nut in which said means is adjustably mounted, said nut being movable in one direction with respect to the cylinder by gravity and in the other direction by said cylinder.

2. In a sirup dispenser for bottle filling machines, the combination with a reciprocating cylinder, of a syrup receptacle mounted therein movable with and relatively to said cylinder, a filler spout carried by said receptacle and having a limited movement relative thereto, a valve operated by said spout for controlling the delivery of sirup to and from said container, a plunger operating in said receptacle, a stem for positioning said plunger in said receptacle, a weight connected to said stem and moved in one direction by said cylinder and movable in the opposite direction by gravity.

3. In a sirup dispenser for bottle filling machines, the combination with a reciprocating support, of a sirup receptacle having a delivery spout, a connection between said receptacle and support for moving the receptacle and support together while permitting a continued downward movement of the support after the receptacle has come to rest on its downward movement, a plunger in said receptacle, and a stem for said plunger engaged by said support, adapted to assist in moving said plunger in one direction and be moved to relieve the plunger of the weight thereof as the support moves upwardly while permitting the support to move downwardly independently of the plunger.

4. In a sirup dispenser for bottle filling machines, the combination with a reciprocating support, of a sirup receptacle having a restricted outlet port at its lower end, means for connecting the receptacle and support to cause the receptacle to move with the support while permitting a continuing downward movement of the support after the downward movement of the receptacle has stopped, a plunger in said receptacle and movable downwardly with respect thereto at a slower rate than said support, and means engaging said plunger and adapted to be engaged and raised by said support to relieve the plunger of the weight thereof as the support moves upwardly.

5. In a sirup dispenser for bottle filling machines, the combination with a reciprocating support, of a sirup receptacle, a connection between said support and receptacle for moving said receptacle with said support in one direction while permitting a continued movement of the support after the receptacle has come to rest, an inertia operated plunger in said receptacle for discharging the sirup in said receptacle therefrom, and a supplemental weight engaging said plunger during its discharge movement and retracted by said support to relieve said plunger of the weight thereof during its return movement.

6. In a sirup dispenser for bottle filling machines, the combination with a reciprocating support, of a sirup receptacle, a connection between said support and receptacle for moving said receptacle with said support in one direction while permitting a continued movement of the support after the receptacle has come to rest, an inertia operated plunger in said receptacle for discharging the sirup therefrom, a supplemental weight engaging said plunger during its discharge movement and retracted by said support to relieve said plunger of the weight thereof during its return movement, and means on said weight for adjusting the height at which said plunger may be raised in said receptacle.

7. The combination with a reciprocating support, of a sirup receptacle, a connection between said support and receptacle for moving said receptacle with said support while permitting the support to move after the receptacle has come to rest, a bottle engaging mouth piece carried by said receptacle and having a relative movement thereto, a valve member controlling the admission of sirup to and the discharge of sirup from said receptacle and operated by the relative movement of said mouth piece, an inertia operated plunger in said receptacle, a weight normally supported by said support and adapted by its inertia to move said plunger in its discharge direction, released by the movement of said support, and retracted by said support in its retracting movement.

8. The combination with a reciprocating support, of a sirup receptacle, a connection between said support and receptacle for moving said receptacle with said support while permitting the support to move after the receptacle has come to rest, a bottle engaging mouth piece carried by said receptacle and having a relative movement thereto, a valve member controlling the admission of sirup to and the discharge of sirup from said receptacle and operated by the relative movement of said mouth piece, an inertia operated plunger in said receptacle, a weight normally supported by said support and adapted by its inertia to move said plunger in its discharge direction, released by the movement of said support, and retracted by said support in its retracting movement, and means for adjusting the normal height of the plunger in the receptacle.

9. The combination with a reciprocating support, of a sirup receptacle, a connection between said support and receptacle for moving said receptacle with said support while permitting the support to move after the receptacle has come to rest, a plunger in said receptacle for forcing the sirup out of said receptacle, an inertia weight imposed upon said plunger by the downward movement of said support, said plunger being relieved of said weight by the upward movement of said support.

10. In a filling machine, a pump for discharging a measured quantity of liquid comprising a body reciprocable in a vertically extending direction, a pump cylinder carried by the body, means for urging the pump cylinder downwardly, a stop for limiting the downward movement, means on the lower end of the cylinder for engaging a container, said means including a discharge valve for the pump cylinder, a piston carried by the body and extending into the pump cylinder, the piston being slidable, yieldable means for urging the piston downwardly, and stop means for the piston.

11. In a filling machine, a pump for discharging a measured quantity of liquid comprising a body, a pump cylinder carried by the body and reciprocable relative thereto, a spring-engaging portion on said body, a spring-engaging portion on said cylinder, a spring interposed between said portions and biasing said cylinder in one direction, a piston movable in the cylinder in said direction for displacing liquid from the cylinder, said piston being also movable relative to the body, and means limiting one movement of the piston relative to the body.

12. In a filling machine, a pump for discharging a measured quantity of liquid comprising a reciprocating support, a pump cylinder mounted in the support for reciprocating relative thereto, container-engaging means carried by and movable with said cylinder spring means for biasing said cylinder in one direction within said support and surrounding said cylinder, means limiting movement of the cylinder relative to the support in said direction, a piston reciprocable in the cylinder for pumping liquid, said piston being also movable relative to the support and means limiting movement of the piston relative to the support in the same direction as the other limiting means.

13. In a filling machine, a pump for discharging a measured quantity of liquid comprising a body, a pump cylinder carried by the body and reciprocable relative thereto, a spring disposed between the upper portion of the body and the lower portion of and surrounding the cylinder and biasing the same in the direction of its outlet and, means limiting movement of the cylinder relative to said body in said direction, a piston reciprocable in the cylinder for pumping liquid, said piston being also movable relative to the body, and means limiting movement of the piston relative to the body in the direction of the outlet end of the cylinder, said cylinder having means engageable with a container to be filled whereby the cylinder is reciprocated to bring about filling.

14. In a filling machine, a pump for discharging a measured quantity of liquid comprising a pump cylinder, a support associated therewith, a piston slidable in said cylinder for discharging liquid from the cylinder upon movement toward the discharge end thereof, the cylinder and the piston being both axially movable, a spring-engaging member on the support, a spring-engaging member on the cylinder, a spring interposed between said members and biasing the cylinder for movement in the direction of discharging movement of the piston, and stops for the piston and the cylinder.

15. In a filling machine, a pump for discharging a measured quantity of liquid comprising a pump cylinder, a support associated therewith, a piston slidable in said cylinder for discharging liquid from the cylinder upon movement toward one end thereof, the cylinder and the piston being axially movable, spring-engaging means on said support and on said cylinder, a spring interposed between said spring-engaging means for biasing the cylinder for movement in the direction of discharging movement of the piston, and an adjustable stop for the cylinder.

16. In a filling machine, a pump for discharging a measured quantity of liquid comprising a body having a spring-engaging part, a pump cylinder carried by the body and having a spring-engaging part, said pump cylinder being reciprocable relative to the body, a spring interposed between said parts to bias the cylinder downwardly, means on the cylinder for engaging a container, a piston reciprocable in the cylinder for pumping liquid, said piston being also movable relative to the body, and means limiting one movement of the piston relative to the body.

17. In a filling machine, a pump for discharging a measured quantity of liquid into a container comprising a body having spring-engaging means, a pump cylinder yieldably carried by the body for vertical reciprocation relative thereto and having spring-engaging means, a spring interposed between said parts for biasing said cylinder downwardly, means cooperating with said body for limiting downward movement of the cylinder relative thereto, means on the cylinder for engaging the container, a piston reciprocable in the cylinder, said piston being also movable relative to the body, and means limiting one movement of the piston relative to the body.

JAMES KANTOR.